W. H. PEARCE.
BATTERY TERMINAL.
APPLICATION FILED SEPT. 9, 1909.
1,012,096.
Patented Dec. 19, 1911.
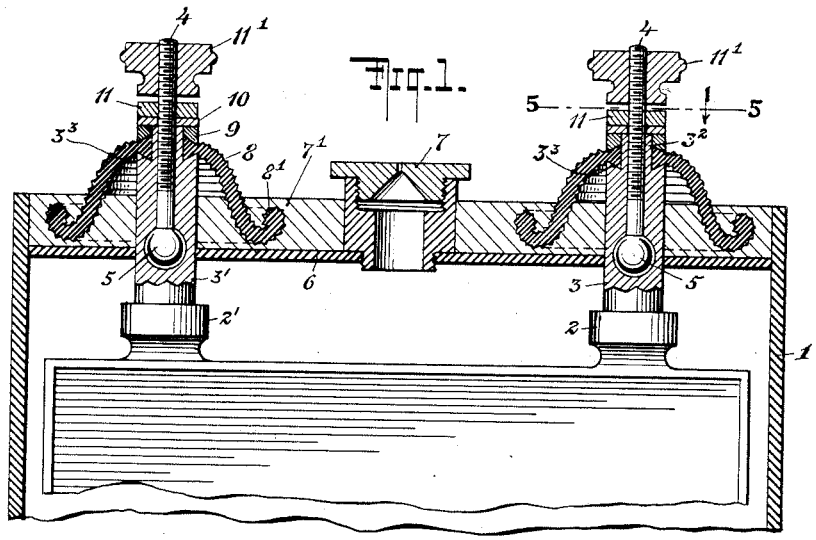
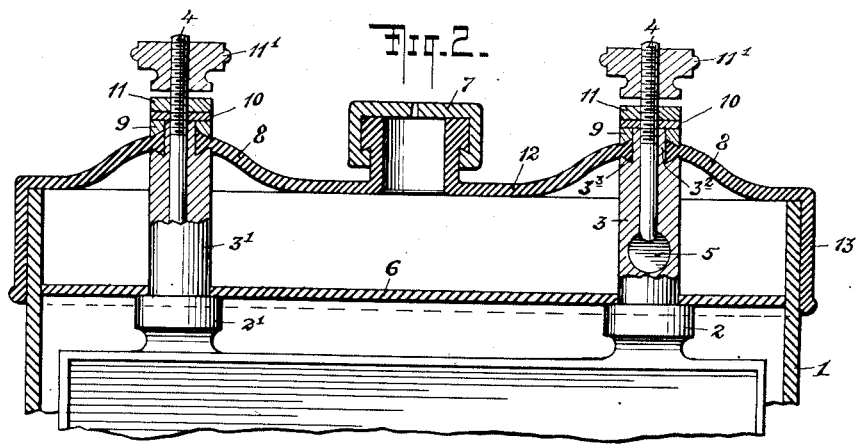
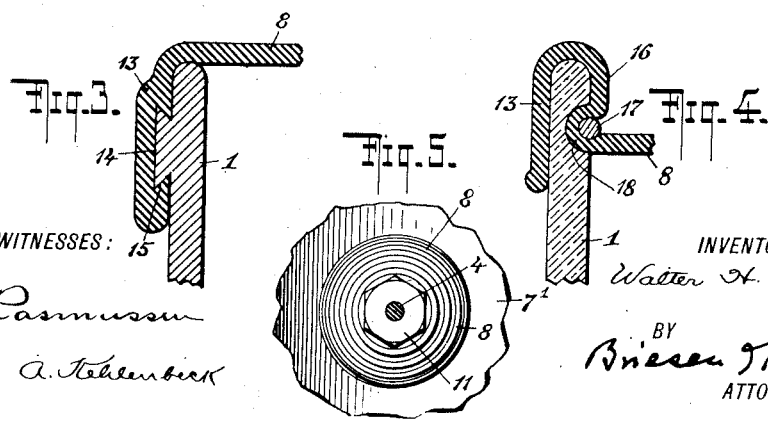
WITNESSES:
INVENTOR
Walter H. Pearce
BY
ATTORNEYS

UNITED STATES PATENT OFFICE.

WALTER H. PEARCE, OF SUMMIT, NEW JERSEY.

BATTERY-TERMINAL.

1,012,096.            Specification of Letters Patent.       Patented Dec. 19, 1911.

Application filed September 9, 1909. Serial No. 516,906.

*To all whom it may concern:*

Be it known that I, WALTER H. PEARCE, a citizen of the United States, and a resident of Summit, Union county, New Jersey, have invented certain new and useful Improvements in Battery-Terminals, of which the following is a specification.

My invention relates to terminals for electrical (voltaic) batteries and more particularly to such terminals as are used for storage batteries or accumulators as they are sometimes called. Such batteries very generally comprise active plates of lead, or lead and lead salts immersed in acid solutions and contained in suitable receptacles of glass, rubber or other material. In the use of such batteries it is common to have suitable electrode terminals of the same material as and integral with the active plates and projecting from said plates above the top of the receptacle, to which terminals are attached the conductors leading to the circuits to be energized.

It has always been difficult, in all electrical batteries to prevent the creeping of the solutions, usually very corrosive, up over the surface of the terminals and upon the conductors and their fittings joined thereto, which they rapidly destroy. In lead batteries particularly, the acid solution, as it creeps over the lead terminal, gradually disintegrates the lead, converting it first into lead sulfate and eventually into "spongy lead" in which condition it acts very effectively as a wick, so as to absorb and draw up increasingly larger quantities of said solution.

It is the object of my invention to provide a means by which said creeping of the corrosive battery fluid over the surface of the terminal to the attached conductors is entirely prevented.

Other objects as *e, g.,* freedom from excessive fumes and (particularly in the case of the modifications shown in Figures 2-4 inclusive) easy access to the cell contents by removal of the battery cover, are incidentally attained.

The exact character of my invention will be better understood by reference to the accompanying drawings which are made a part of this specification and in which—

Fig. 1 represents a vertical section part elevation (the bottom being broken away) through positive and negative terminals of a storage battery provided with my invention; Fig. 2 represents a similar section embodying a modified form of my invention; Figs. 3 and 4 illustrate a detail of two other modifications of my invention; and Fig. 5 represents a section, looking from above, taken along the line 5—5 through one of the terminals of Fig. 1.

Referring to the drawings, 1 is a receptacle of glass, rubber or other material not appreciably acted upon by the battery fluid, in which are positive and negative battery plates having upwardly projecting terminal bosses 2, $2^1$. Each of these plates is of lead and has fixed to it at the top of said boss and integral therewith, a lead terminal 3, $3^1$. This terminal extends somewhat above the top of receptacle 1 and consists essentially of a lead cylinder turned down at the top to provide a cylindrical neck portion $3^2$ provided at the bottom of said neck with a centrally and downwardly dished or tapered shoulder $3^3$. Cast axially in the lead electrode is a brass terminal screw 4 having an enlargement 5 at its lower end to prevent its being drawn out from said electrode.

Closing the top of the receptacle and pierced with two holes to take the two electrodes 3, $3^1$ is a plate 6 of hard fiber or other suitable material; this plate carries at its center the usual vent 7 for the issue of any gases which may be generated and for use in removing or adding battery fluid to the cell. Plate 6 is set down a little below the top of the receptacle and has poured upon it plastic sealing compound $7^1$ up to the level of the seal. This sealing compound, which may be one of the many of the well known compositions used for this purpose, is applied when hot and makes a close juncture with the surface of plate 6, with the inner top of receptacle 1 and with the electrode terminals. Before pouring in this sealing compound each electrode terminal is provided with an annular soft rubber petticoat or skirt 8. This petticoat has a central hole somewhat smaller than the neck $3^2$ of the electrode terminal, so that when pressed down over said neck it has tight elastic contact therewith; and the lower rim $8^1$ of the petticoat is upturned as shown in the drawing. These petticoats may easily be made in large quantities at comparatively small cost by preparing suitable molds.

Above the petticoat and adapted to press its central part down upon the top cylinder is a washer 9, centrally bored to fit neck $3^2$, the top of said washer being plane and its lower surface being dished out oppositely to that of the upper surface of the electrode shoulder $3^3$. Above 9 is placed a flat washer 10 and above this an ordinary threaded nut 11. The thickness of 9 is so regulated that when washer 10 is pressed squarely against the top of the neck, the central portion of skirt 8 is very tightly clamped between washer 9 and the shoulder $3^3$ of the electrode; care should be taken, however, that the various dimensions involved, i. e., thickness of washers, length of neck, etc., are such that the skirt is not clamped with sufficient tightness to cut it. A nut $11^1$ upon the top of terminal screw 4 may be used to clamp the conductor (not shown) by means of which current is taken from the battery to the terminal. Before pouring in the sealing compound the bottom of the skirt is arranged to be slightly above the plate 6, but with the rim $8^1$ well below the final surface of the sealing compound.

With the above described construction it will be impossible for the battery fluid to reach the brass fittings 9, 10, 11, $11^1$ above the skirt, the conductors leading from the electrode, or the central terminal screw 4. This battery fluid may and will creep up the electrode through plate 6 and through the sealing compound, but when it reaches the lower surface of skirt 8 it is unable to follow the surface of the neck $3^3$ inwardly and up through and around the central holes of the skirt, because of the tightness with which the central part of the skirt is clenched between washer 9 and the shoulder $3^3$ while any battery fluid which tends to pass up the electrode through the sealing compound and then over the lower surface of the skirt through the sealing compound again and up around the rim of the skirt will not only be obstructed by the long surface of contact where the skirt is sealed into the compound, but will also have a very considerable distance to travel over the surface of the skirt outside the compound. Both of these surfaces may be greatly increased by corrugating the surfaces of the skirt as shown in the figures, the corrugations being formed in concentric circles about the axis of the skirt.

Fig. 2 represents a form of my invention adapted especially for use with glass jars and particularly convenient in permanent installations of batteries where vibration and jarring is not to be feared, as in central stations, house lighting plants, etc. The arrangement forms a nearly complete closure to the escape of fumes into the atmosphere in addition to preventing creeping of the battery fluids to the corrodible mountings of the battery, after the manner of the arrangement shown in Fig. 1. As shown in Fig. 2, the plate 6 is used as before, but serves merely to laterally steady the plates in position. No sealing compound is used, but the two skirts are merged into and united by a soft rubber blanket (as it may be called) 12 having in its central portion the vent 7 and on its periphery a downwardly projecting flange 13 which is slipped over the top edges of the cell, and if made just slightly smaller than the cell, will make tight contact therewith. The vent 7, skirts 8, flange 13, etc., are preferably all vulcanized integrally together into a one piece construction.

Fig. 3 shows a modified form of the flange as used in Fig. 2, said flange being now formed with a dovetail portion 14 adapted to fit in a corresponding dovetail 15 formed around the outside of the jar. This particular modification is suited to either glass or rubber jars.

Fig. 4 shows still another method of attaching the modification of Fig. 2. In this form the blanket 12 is formed with the outer downwardly projecting portion 13 as before and with an inner second downwardly projecting portion 16, the latter being adapted to fit within the jar and to be held in place by a spring wire 17 which is slipped inside the cell, and which has provided for it in the wall of the cell a corresponding groove 18.

For the sake of simplicity I have shown my invention as applied to a battery having but two plates and two terminals. But many and perhaps most batteries have more than two plates and more than two terminals, a greater or less number of terminals being used at any one time according as a greater or less current supply is required; and there are other well known reasons for the use of more than two terminals. My invention is intended to apply, if so desired to each and every terminal of a battery, however so many there may be.

To distinguish between positive and negative terminals in the application of my invention, I may use skirts for said opposite polarities of different colors as e. g., red and black, red and white, etc.

Many changes of detail, as in the diameter, height and thickness of the skirt, character of surface of the skirt, relative diameter of neck and body, portions of the lead terminal proper, etc., may be made without departure from the spirit of my invention which I have defined in the following claims.

I claim:

1. In a battery the combination of a terminal having a neck provided with a shoulder, a skirt apertured to fit said neck adjacent to said shoulder, a washer upon said neck adjacent to said skirt and means for clamping the skirt between said washer and said shoulder, as and for the purpose described.

2. In a battery the combination of a terminal having a neck provided with a shoulder, a skirt apertured to fit said neck adjacent to said shoulder and provided with an outwardly extended rim positively united to the battery top, a washer upon said neck adjacent to said skirt, and means for clamping the skirt between said washer and said shoulder, as and for the purpose described.

3. In a battery the combination of a terminal having a neck provided with a shoulder and an adjacent washer one of which is dished with reference to the other, a skirt apertured to fit said neck and provided with an outwardly extended rim positively united to the battery top, and means for clamping the skirt between said shoulder and said washer, substantially as and for the purpose described.

4. In a battery, the combination of a terminal having a neck provided with a shoulder, a skirt apertured to fit said neck adjacent to said shoulder, and means for clamping said skirt against said shoulder, as and for the purpose described.

5. In a battery, the combination of a terminal having a neck provided with a shoulder, a skirt apertured to fit said neck adjacent to said shoulder and provided with an outwardly extended rim positively united to the battery top, and means for clamping said skirt against said shoulder, as and for the purpose described.

6. In a battery, the combination of a terminal having a neck provided with a shoulder, a skirt of yielding material apertured to fit said neck adjacent to said shoulder, and means for clamping said skirt against said shoulder, as and for the purpose described.

In testimony whereof I have hereunto set my hand in the presence of two subscribing witnesses.

WALTER H. PEARCE.

Witnesses:
ELMER G. WILLYOUNG,
JOHN A. KEHLENBECK.